United States Patent [19]

Lundin

[11] Patent Number: 5,008,522

[45] Date of Patent: Apr. 16, 1991

[54] DEVICE FOR THE SELECTIVE DETECTION OF OBJECTS

[75] Inventor: Jan-Erik Lundin, Västra Frölunda, Sweden

[73] Assignee: Saab Missiles Aktiebolag, Sweden

[21] Appl. No.: 378,514
[22] PCT Filed: May 27, 1988
[86] PCT. No.: PCT/SE88/00291
§ 371 Date: Feb. 28, 1989
§ 102(e) Date: Feb. 28, 1989

[30] Foreign Application Priority Data

May 29, 1987 [SE] Sweden ................................ 8702247

[51] Int. Cl.$^5$ ............................................. G01J 1/20
[52] U.S. Cl. ................................ 250/203.6; 250/208.1
[58] Field of Search ............... 250/203 R, 334, 203.6, 250/208.1; 244/3.16; 358/113; 356/1, 4, 5, 141, 152

[56] References Cited

U.S. PATENT DOCUMENTS

| | | |
|---|---|---|
| 1,343,393 | 6/1920 | Hoffman . |
| 2,972,924 | 2/1961 | Clemens . |
| 3,736,057 | 5/1973 | Harvey . |
| 4,004,852 | 1/1977 | Pentecost . |
| 4,178,098 | 12/1979 | Asano et al. . |
| 4,667,090 | 5/1987 | Carreras et al. ............... 250/203 R |
| 4,675,532 | 6/1987 | Carson ............................ 244/3.16 |
| 4,719,350 | 1/1988 | Alm .................................. 250/334 |
| 4,868,652 | 9/1989 | Nutton ............................. 250/334 |

FOREIGN PATENT DOCUMENTS 2068193 11/1980 United Kingdom .

Primary Examiner—David C. Nelms
Attorney, Agent, or Firm—Lowe, Price, Leblanc, Becker & Shur

[57] ABSTRACT

A device for the selective detection of objects, such as aircraft, missiles, helicopters and the like, by detecting outgoing rays emitted from the objects, preferably infrared rays, comprises at least one sensor unit with two optical entrances arranged at a distance relative to each other across a sight line from the device to the object. The sensor unit includes at least one focusing arrangement for focusing the rays onto a focal plane. The sensor unit includes at least one radiation sensitive detector element arranged to emit signals corresponding to the amount of radiation. The device is arranged to variably scan an angular field in azimuth and/or elevation. The device further includes an evaluation unit arranged to receive the signals. The evaluation unit is arranged to select objects which seem to be of similar size with respect to the angle measured from the position of the device, on the one hand large objects being at a long distance, such as aircraft, and on the other hand small objects being at a short distance, such as birds, by suppressing signals whose amplitude is a function of the scanned azimuth or elevation angle showing a relatively large size compared with signals showing a relatively small size.

14 Claims, 10 Drawing Sheets

Figure 16a

| 1 | 3 | 1 | 1 | 2 |
|---|---|---|---|---|
| 0 | 0 | 3 | 3 | 1 |
| 1 | 1 | 2 | 3 | 0 | output signal 3-3 = 0

Figure 16b

| 0 | 1 | 0 | 0 | 0 |
|---|---|---|---|---|
| 1 | 1 | 3 | 2 | 1 |
| 1 | 1 | 1 | 0 | 0 | output signal 3-1 = 2

DEVICE FOR THE SELECTIVE DETECTION OF OBJECTS

TECHNICAL FIELD

The present invention relates to a device for the selective detection of objects, such as aircraft, missiles, helicopters and the like by detecting rays emitted from the objects, preferably infrared rays.

BACKGROUND OF THE INVENTION

The invention is based on a known technique, which will here be described briefly herein below.

On the market there is a device, a so-called scanner, intended for detecting flying objects by means of IR-rays emitted from the objects. Such a scanner comprises a sensor unit, an evaluation unit and a display and control unit. The sensor unit receives IR-rays from the objects to be detected within the momentarily scanned solid angle. The sensor unit transmits the corresponding signals to the evaluation unit, which processes the signals and upon the significant detection of objects, i.e., in a military context, targets, transmits the corresponding signals including direction coordinates to the display and control unit. From it the collected output data go, which in a military context partly takes the form of a visible picture on a screen, and partly the form of signals, may be forwarded online and e.g., be used for guidIng a fire-control system for anti-aircraft defense.

The evaluation unit has as its purpose to select those signals, among the signals received from the sensor unit, which are significant, i.e., which indicate targets within the scanning range of the sensor unit, and to indicate when such targets appear, and generally to indicate their coordinates. The evaluation unit functions thus according to preselected programmed criteria of what will be considered significant objects, i.e., targets.

The evaluation unit has a filter function and a decision function. The signals which are received from the sensor unit (measured intensity as a function of direction) are inputted to the filter which is designed to enhance the typical signals of targets. During filtering the directional information is retained. A resulting filter output signal for a certain direction is a measure of the probability that there is a target in the actual direction.

A concrete example is a filter, which for every direction forms the difference between measured intensity in the actual direction and the average intensity in a two-dimensional interval of the surrounding directions. Typical for a filter in this application is particularly that the output signal for a certain direction is a weighted sum of the input signals of the filter in an angular range in and about that direction.

In a scanner whose purpose is to select significant objects, i.e., targets, in addition to the filter, a decision function is also required. That function decides whether a significant object exists or not. The most common decision function is to compare the output signal of the filter with a threshold level. If the threshold is exceeded, a significant object, i.e., a target, is indicated. The mechanism which chooses the threshold level may also be included in the decision function. The threshold level is often determined through statistical evaluation of the output signals of the filter within a large range, possibly the whole scanning range. The object is to find a level which is exceeded at an acceptably low frequency in the absence of significant objects, i.e., targets (false-alarm frequency) and which yet is not too high for appearing targets to be indicated with certainty.

Scanners of the type described aboved function preferably within the IR-spectral ranges 3 to 5 and 7 to 13 micrometers, respectively, which represent "windows" with regard to the transmission spectra of the atmosphere for IR-radiation. That means that the focusing means of the sensor unit, which in itself can consist of a lens or mirror, usually consists of a silicon lens for the 3 to 5 micrometer range and a germanium lens for the 7 to 13 micrometer range, i.e., it is chosen with respect to the actual spectral range. In view of hitherto existing corresponding radiation-sensitive detector elements, such a lens must be made comparatively large, in order that the sensor unit will produce signals such that the evaluation unit can detect significant targets with any appreciable precision.

Such a scanner cannot distinguish between birds (i.e., insignificant objects) at a relatively close distance and aircraft (i.e., significant objects) at a longer distance) which means that birds could cause a false alarm which is a great disadvantage in hitherto known scanners of the type described above.

It is therefore an object of the present invention is to design a device wherein it is possible to distinguish between relatively close objects from which radiation is emitted, and such objects which are located at a longer distance, but which objects when observed subtend a similar solid angle.

SUMMARY OF THE INVENTION

The device according to the present invention comprises at least one sensor unit, whereby the device is arranged to receive the outgoing or emitted rays through at least two optical entrances arranged at a relative distance across a slight line from the device to the object. The sensor unit includes at least one focusing means arranged to focus the rays onto at least one corresponding focal plane. The sensor unit is equipped with at least one radiation-sensitive detector element being positioned in a focal plane; the detector element is arranged to emit signals corresponding to the incoming radiation. The device is arranged to variably scan an angular field in azimuth and/or elevation. The device further comprises an evaluation unit, arranged to receive said signals.

According to the invention, the evaluation unit is arranged to select objects which seem to be of similar size with respect to the angle measured from the position of the device, on the one hand large objects being at a long distance, such as aircraft etc., and on the other hand small objects being at a short distance, such as birds etc., by suppressing signals whose amplitude as a function of the scanned azimuth or elevation angle shows a relatively large size compared with signals which show a relatively small size.

In one embodiment of the device according to the invention the device comprises at least two sensor units, having their optical entrances for the outgoing rays from the objects at a relative distance across the sight line. In this case, each sensor unit functions in itself as a complete unit. Naturally, a corresponding signal processing in the evaluation unit is required, i.e., the signals from the sensor units shall be added before effecting further signal processing in the evaluation unit. It is suitable to design a sensor unit so that each optical entrance comprises a deflection means, preferably a mirror, arranged to deflect the incoming rays at the entrance to the corresponding focusing means. If one mirror per optical entrance is used as a deflection means, the mirrors used must naturally be so arranged that the radiation from each mirror, usually positioned at an angle of 45° to the incoming rays, can in fact reach the focusing means. This is achieved through an arrangement wherein the apertures of the optical entrances are so displaced not only in a first direction relative to the sight line, which is a condition for the proper function of the device, but also in a second direction perpendicular to the first direction. It is also conceive to use mirrors which are partly transparent to the actual radiation. If it is desired to have the optical entrances arranged in two groups, one on each side of this focusing means, an extra mirror per group may be arranged to guide the radiation, which is transmitted from the group, to the focusing means. That is usually a lens, as in the case of IR-radiation made of e.g., germaniums, but concave mirrors are also possible, e.g., according to the Cassegrain-system. Other defection means can be used, such as prisms arranged to totally reflect the incoming rays. The optical axes of the optical entrances shall be parallel.

The device according to the invention may under certain circumstances, include one single detector element but it is preferred to use a so-called array consisting of a number of detector elements arranged in a row. Such detector elements can also be arranged in a plane, i.e., two-dimensionally.

The device can be designed so as to be able to scan a small or large solid angle in azimuth and elevation. The detector elements of the sensor units, either one single or several elements arranged either as a one-dimensional or two-dimensional array, call for different arrangements for widening the viewed angle in azimuth or elevation.

In a suitable embodiment of the device according to the invention the device as a whole is rotatable about an essentially vertical axis, whereby a number of optical entrances are arranged at a distance from said axis, across the sight line toward an imaginary object. The device is further movable in elevation e.g., step-by-step, so that it e.g., rotates one about in every chosen elevation position. The movement in elevation can alternatively be continuous.

The scanning range can be arbitrarily large or small provided that the scanning can be effected across the object in at least one direction which lies within the plane where the object and al least two optical entrances are situated.

An angle position transducer for azimuth and elevation provides a position signal to the evaluation unit for every instantaneous measuring direction.

Instead of rotating the device it can be made to move e.g., forward and backward.

It is further possible to let the device as a whole be immobile and instead let the sensor unit move or, where appropriate, the sensor units include an optical scanning means, arranged to variably scan an optic angle, in addition to the angle which is scannable with the corresponding detector element, in azimuth and/or elevation. One way of achieving this is to arrange the deflection means, e.g., the mirrors, to be movable. In an extreme case a sensor unit can be arranged with one single detector element, having a scanning means, such as a mirror functioning as a deflection means, which mirror is movable about two axes perpendicular to each other. Such an arrangement, however, should have a limited practical applicability, even with a corresponding evaluation unit. In such a device better performance can be achieved if the detector elements are arranged as an area array, i.e., two-dimensionally.

In a preferred embodiment of the invention there are provided optical entrances arranged in groups. These groups can suitably comprise two optical entrances each. The distance between the optical entrances in a group will thus be shorter than the distance between two optical entrances belonging to different groups. Through such an arrangement, further suppressing of signals which originate from comparatively small, comparatively close objects is achieved.

The invention will now be described more in detail with reference to the accompanying figures which relates to an example of one embodiment of the device, i.e., a scanner designed for military use with the aid of IR-technique.

BRIEF DESCRIPTION OF THE DRAWING

FIGS. 15 and 16a and 16b show diagrammatically the function of a filter.

DETAILED DESCRIPTION OF THE INVENTION

Figure 1:
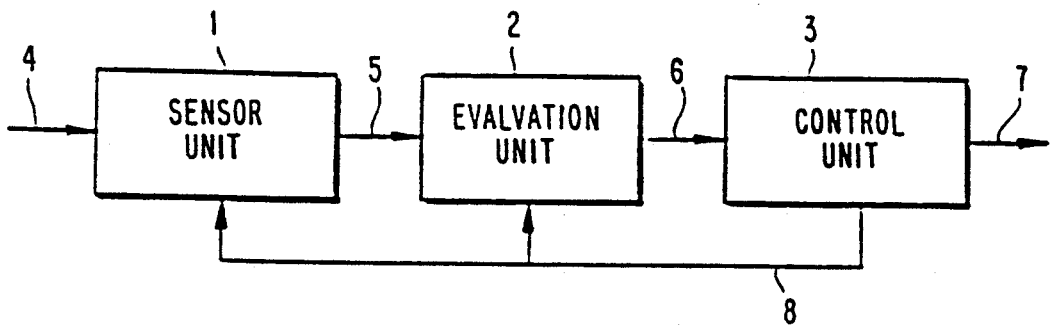
FIG. 1 is a block diagram of the scanner.

In FIG. 1, there is shown a sensor unit 1, an evaluation unit 2 and a display and control unit 2. IR-rays received from objects within the scanning range generate corresponding signals 5 transmitted from the sensor unit to the evaluation unit wherein evaluated signals 6 for significant objects are generated and transmitted to the display and control unit 3. Collected output data 7 from unit 3 may take the form of a visible picture on a screen and also signals for e.g., guiding a fire-control system for anti-aircraft defense. The connection designated by 8 transmits starting and stopping commands etc., to the units 1 and 2.

Figure 2:
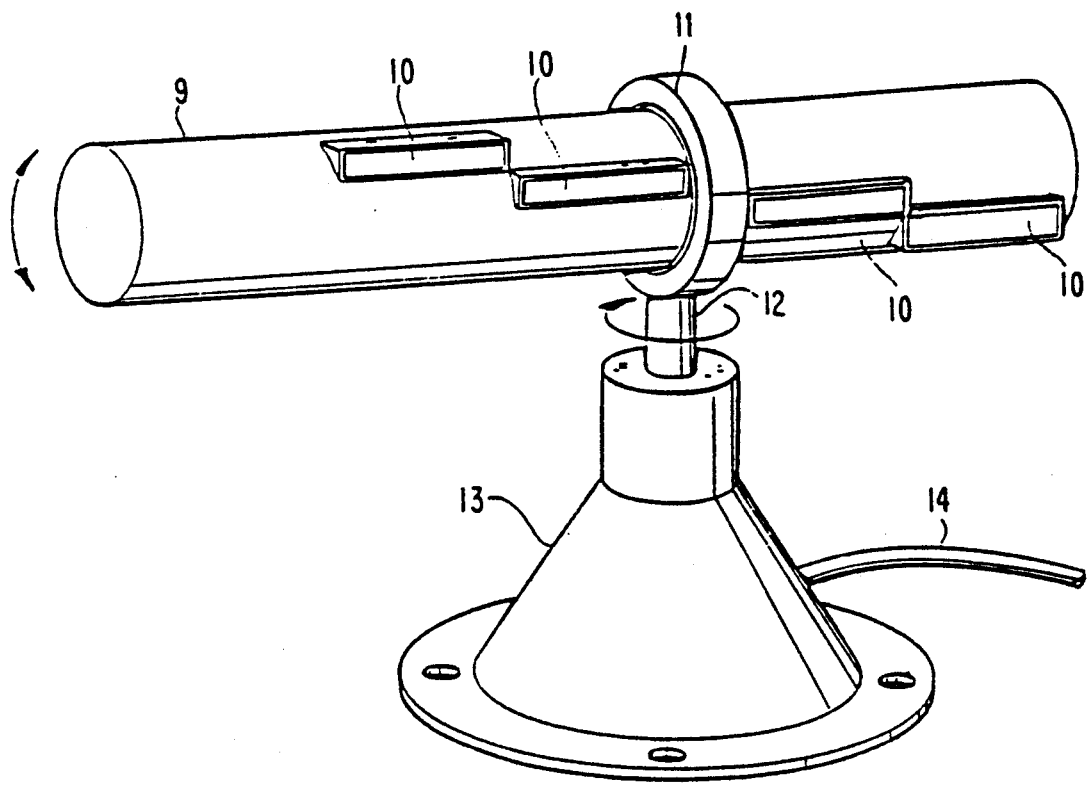
FIG. 2 is a perspective view of the sensor unit in the scanner.

The sensor unit 1 (FIG. 2) comprises a sensor head with apertures 10 defining four optical entrances. The sensor head is suspended from an elevation servo 11, for a step-by-step adjustment into different elevation angles by turning about a horizontal axis. The elevation servo 11 is rigidly connected with a vertical axis 12, supported on a stand 13. A motor within the standis arranged to drive the axis 12 with a constant number of revolutions per second. This in addition there is an angle transducer and slip rings required for signal transmittance through a cable 14 to the other units.

Figure 3:
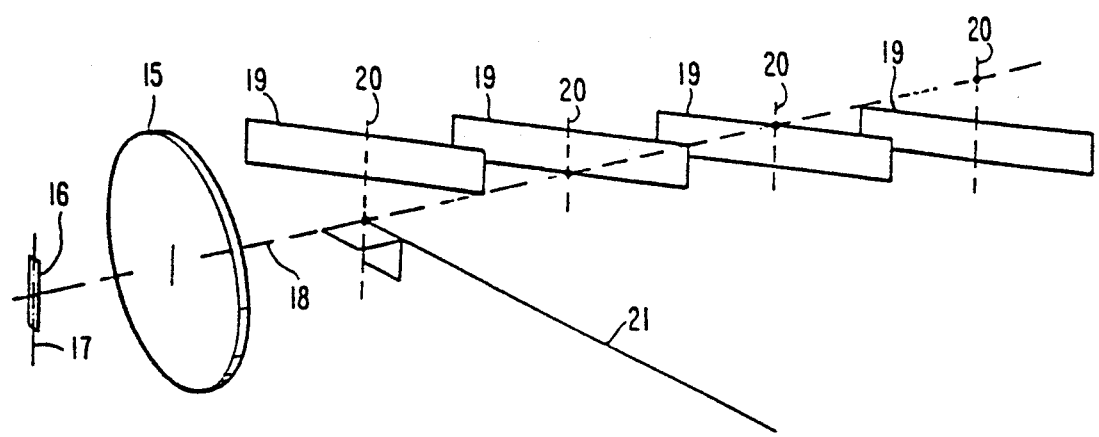
FIG. 3 depicts the optical arrangement of the sensor unit.

The optical arrangements in the sensor head 9 can be seen in in FIG. 3 wherein a focusing means includes a lens 15. In its focal plane a number of detector elements are arranged into an array 16 with its axis 17 perpendicular to the horizontal principal axis 18 of the lens. On the other side of the lens 15 four plain rectangular mirrors 19 are arranged, whose symmetry axes 20, which are parallel to the short sides of the mirrors, intersect the principal axis 18 of the lens and are parallel to the axis 17 of the detector array 16. The mirrors are parallel relative to each other and the mirror plane forms an angle of 45° to the plane defined by the axes 17, 18. The mirrors 19 are so displaced relative to each other along the symmetry axis 20, and are of such a size that partly the effective total aperture of the sensor unit is principally the same as the area of the lens, and partly, all the mirrors contribute principally equally to said apertures. The optical axis 21 of the sensor head is defined as the axis which interacts the axes 18, 20 at right angles by the mirror which is the closest to the lens. It is understood that an object on the optical axis 21 at a long distance will be reproduced as a dot at the opener of the detector array 16.

Figure 4:
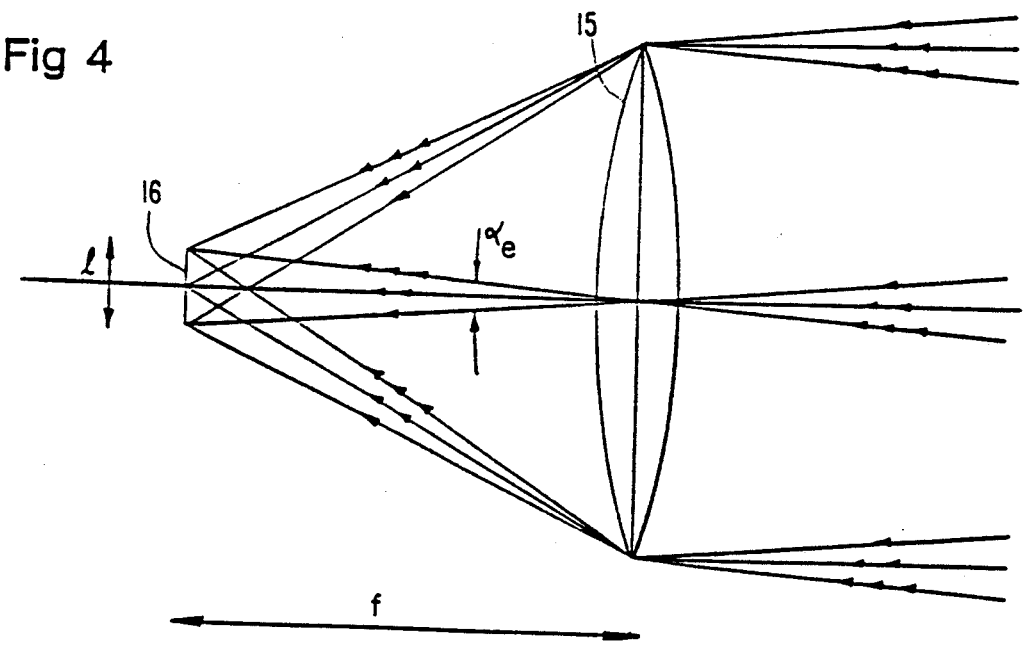
FIG. 4 depicts focusing means and detector elements.

In FIG. 4 the focusing means, i.e., the lens 15 and the detector array 16, is drawn in with realistic size relationship. The detector array has a length 1 and the lens a focal length f. In the figure is drawn rays traced from three different small objects being at a long distance and so that they are reproduced in the extreme positions and the center, respectively, of the detector array.

It is understood that the field of view $\alpha_e$ those of the sensor unit 1 in the shown plane is $$\alpha_e =$$

In this example $\alpha_e = 0.16$ radian or 160 milliradians.

Figure 5:
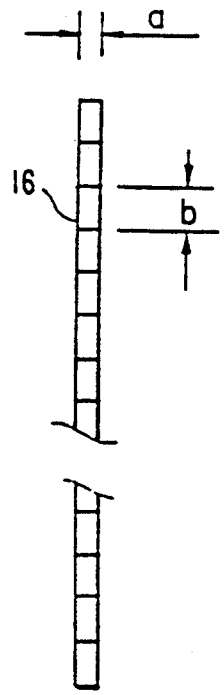
FIG. 5 is a linear array of detector elements.

In FIG. 5 the appearance of the detector array is shown in more in detail. In this example there are 64 similar separate detector elements of a size a×b. In this example a=0.2 mm and b=0.5 mm. The length of the detector array is thus 64×0.5 mm = 32 mm. As a consequence the focal length of the lens is 200 mm. Each detector element covers a solid angle of 2.5 mrad = 1 mrad.

Figure 6:
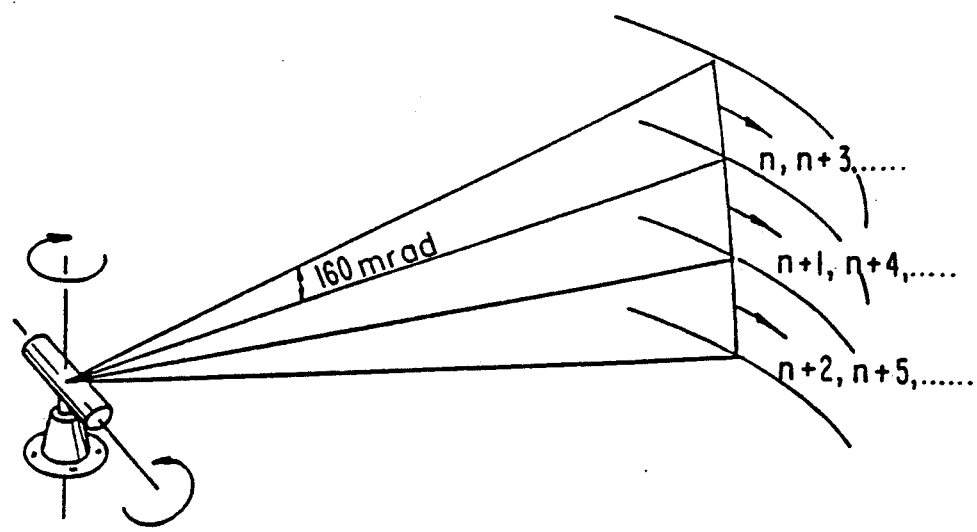
FIG. 6 diagrammatically depicts the scanning method of the device.

With respect to FIGS. 2 to 5 it is evident that the sensor unit can measure simultaneously the incident-ray intensity in 64 directions 2.5 mrad from each other within a sector of 160 mrad in the vertical plane, whereby the resolution is 2.5 mrad in elevation. By rotating the sensor head about the vertical axis 12 in FIG. 2, measuring can be effected for azimuth angles throughout the whole revolution with an angular resolution of 1.0 mrad. Between different revolutions the elevation of the sensor head is altered with the aid of the elevation servo 11. A complete scanning can e.g., comprise three revolutions, i.e., a scanning of a range of elevation of 540 mrad or about 31°. Such a scanning cycle is shown in FIG. 6.

Figure 7:
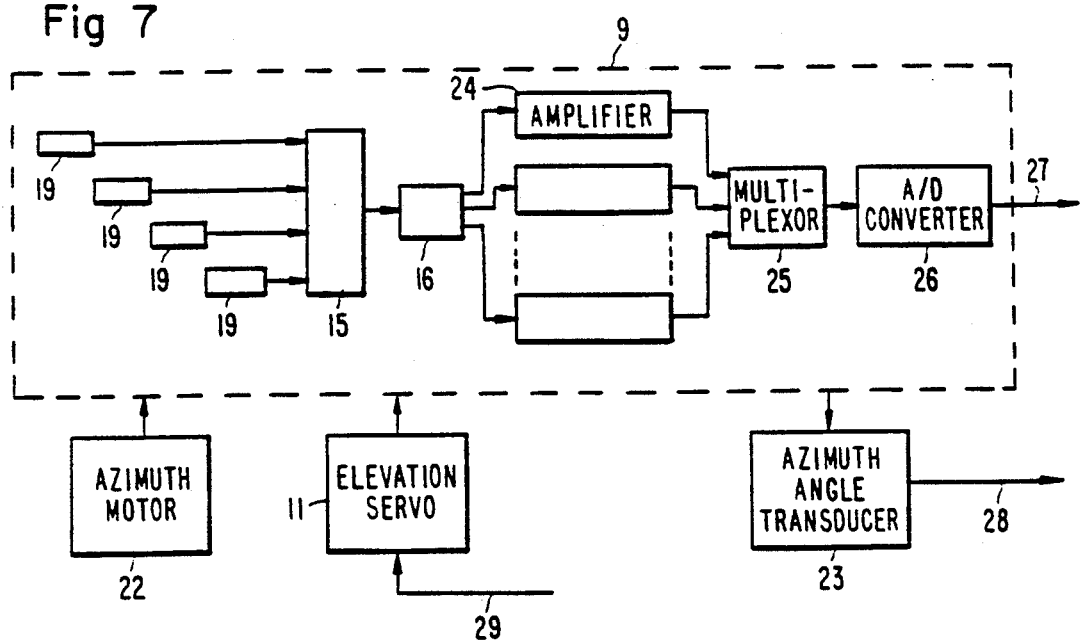
FIG. 7 is a block diagram of the sensor unit.

A block diagram of the sensor unit is shown in FIG. 7. Here, the sensor head is designated by 9, whereas an azimuth motor is designated by 22, an elevation servo by 11, an azimuth angle transducer by 23, the mirrors by 19, the lens by 15, the detector array by an amplifier by 24, a multiplexer by 25 and an A/D-converter by 26. The sensor unit emits output signals 27, 28.

The signal 27, then, is a digital signal in series form which in a certain sequence and with a certain scale factor designates the incident-ray intensity measured via the respective detector elements. The signal 28 shows the azimuth direction of the optical axis of the sensor head. The elevation servo 11 is controlled by a signal 29. During a complete scanning cycle of three revolutions the signals 27, 28 and 29 describe the measured radiation intensity as a function of direction in the whole scanned solid angle range, which, as discussed above, in this case covers 540 mrad in elevation and the whole revolution in azimuth.

The measuring values produced by the sensor unit inputted to the evaluation unit during a scanning cycle, can mathematically be said to describe a matrix, here designated by A, whose elements $a_{ij}$ designate the measured incident radiation intensity in the direction azimuth = i×0.5 milliradians elevation = j×2.5 milliradians relative to a chosen reference direction. The matrix will be referred to below in connection with an example of filter operation.

The signal from each separate detector element is read with a spacing in azimuth which is similar to half of the angle width of the detector element, i.e., 0.5 mrad. Totally, a large number of measured values will thus be emitted from detector elements in the form of digital signals to the evaluation unit, where they are stored in a memory, and can be visualized on e.g., a cathode-ray tube in such a way that the picture shows a plane picture of the scene which is covered by the scanned range. In the picture the luminous intensity in a certain point is a measure of the measured incident IR-radiation intensity in the measuring direction corresponding to the direction of the point.

Figure 8:
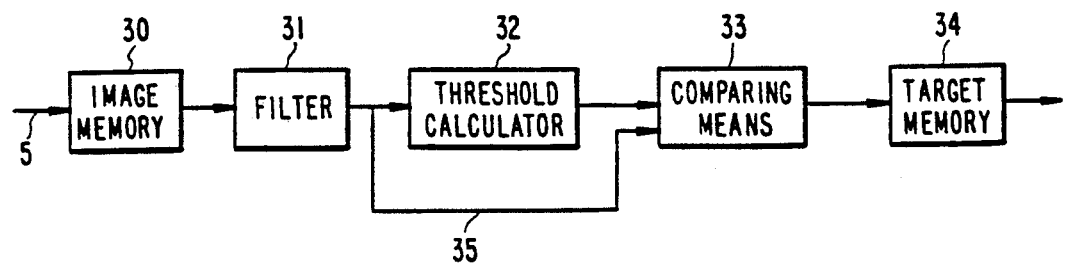
FIG. 8 is a block diagram of the evaluation unit.

The evaluation unit 2 of FIG. 8 is in the form of a block diagram and includes a memory 30 (which in this connection is called image memory), a filter 31, a threshold calculator 32, a comparing means 33 and a target memory 34. Via the sensor unit the digital signals from the detector elements are available. In the image memory 30 different combinations of digital signals from the detector elements are stored temporarily, according to a certain sequence, thus representing different parts of the scanned angular range in such a way that during a scanning cycle, the signals from all the parts of the scanning range can be processed by the filter 31, which calculates, in a known manner, the difference between the signal intensity in a chosen direction and the signal intensity in the area surrounding it, area by area of the scanned range.

To determine whether a significant object has been measured or not, a decision function is now used, comprising the threshold calculator 32 and the comparing means 33, which comparing means also has a direct connection with the filter 31.

The evaluation function will now be shown by example.

Figure 9:
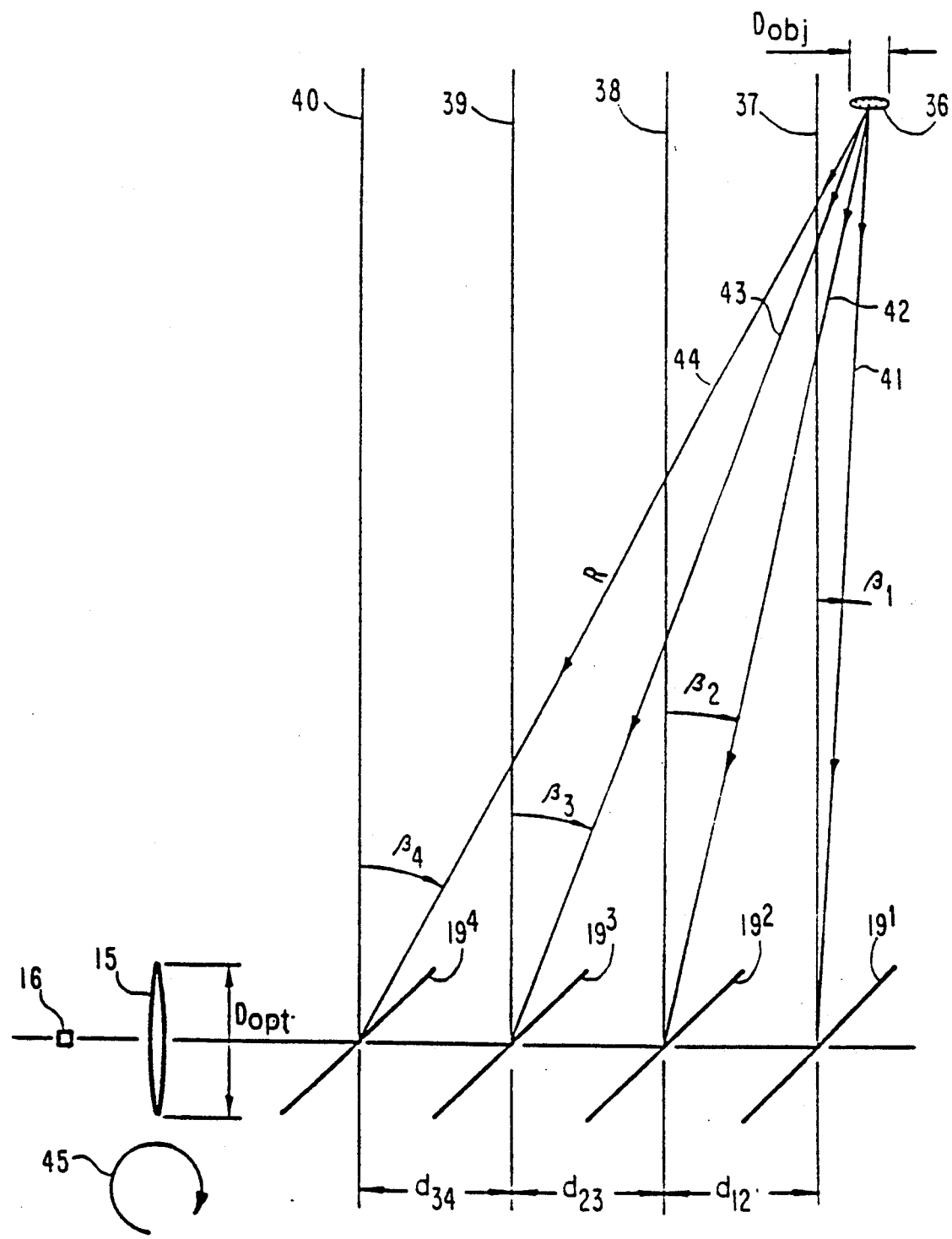
FIG. 9 depicts a sensor head, diagrammatically seen from above.

In FIG. 9 there is depicted (vertically from above) the mirrors 1, the lens 15, the detector element 16, an object 36, the optical axes of the optical entrances 37-40 and rays from the objects to the optical entrances 41-44. This in the figure a scanner is shown in the scanning position $\beta = 0$, i.e., azimuth position 0. Scanning is effected by means of rotation in the clockwise direction (i.e., arrow 45). The diameter of the lens is $D_{opt}$, and the distance between the mirrors is $d_{12}$, $d_{23}$, and $d_{34}$. The angular distance of the object from the respective optical axis is $\beta_1$, $\beta_2$, $\beta_3$ and $\beta_4$ and the distance to the object is R. The size of the object is $D_{obj}$.

As an example of measured lest results, some diagrams are given below which show the function of the device The device has in this example the following dimensions:

| | |
|---|---|
| $D_{opt}$ | = 0.20 m |
| $d_{12}$ | = 0.25 m |
| $d_{23}$ | = 0.50 m |
| $d_{34}$ | = 0.25 m |
| $\beta_1$ | = 2.00 mrad | if R is varied from 90 m to 10 km a number of diagrams will be obtained, where the vertical axis in all the oases is related to the signal amplitude.

As is evident from the choice of $d_{12}$, $d_{23}$ and $d_{34}$, the mirrors in this example are arranged in two pairs with regard to the distance The distance within each pair is 0.25 m. The distance between the pairs is 0.50 m, measured as the distance between the middle two of the four. The objective is to prove the effect of the mirrors being positioned in this particular manner.

When choosing the parameter values, as well as the examples of embodiments of the scanner otherwise, the objective is not to describe an optimal solution but merely to give one solution to illustrate the invention.

The following examples, FIGS. 10-14, relate to objects which, seen from the device i.e., the optical entrances of the sensor unit, show a similar solid angle extension and similar radiation intensity, i.e., birds at a comparatively shorter distance and aircraft at a longer distance.

Figure 10:
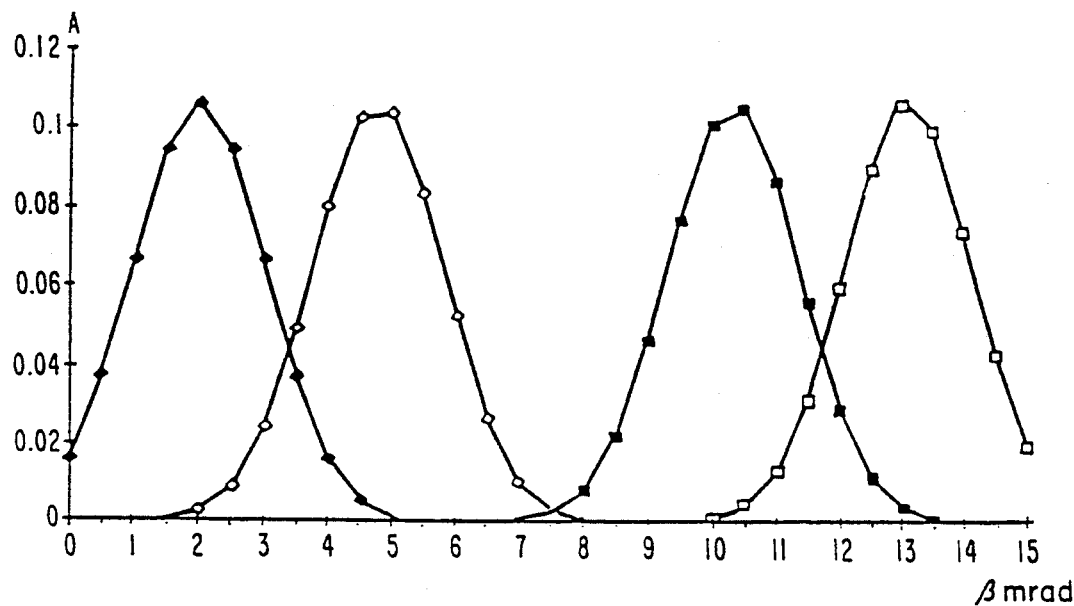
FIG. 10 is a graph showing signal amplitude via the four optical entrances in FIG. 9 as a function of the azimuth angle.
Figure 11:
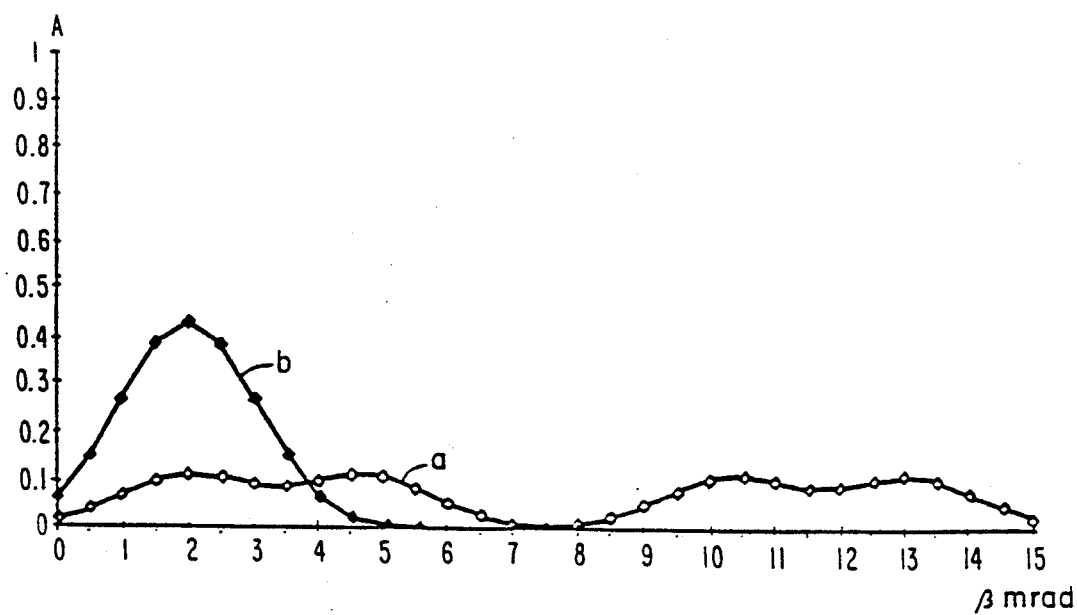
FIG. 11 is a graph showing detector output signal with four and one optical entrances, respectively.

In FIG. 10 there is shown, for example, at a 90-m distance, the four optical signals 1–4 which reach the detector via the four mirrors. The numbering of the signals in FIG. 10 corresponds to the numbering of the mirrors in FIG. 9. It is to be observed that the output signal of the detector is equal to the sum of those four optical signals. The output signal of the detector is shown in FIG. 11 (curve a). In FIG. 11 (curve b) the detector signal is shown in the case of one single optical entrance. FIG. 11 relates to the distance 90 m, as does FIG. 10.

The functioning of the filter 31 will be described with reference to FIG. 15 the figure shows a section of the matrix A where each element in the matrix is represented by a square check. In the check pattern two areas have been indicated, designated core and frame, respectively. The core comprises three matrix elements, the element $a_{ij}$ being in the middle. The frame comprises the matrix elements which adjoin the core and surround it. The filter function is to calculate the difference between the highest element value in the core and the highest element value in the frame. The calculation is done for every possible position (i,j) in the matrix A. The result is a new matrix B with the elements $b_{ij}$, which is the output signal of the filter.

The function of the filter 31 is illustrated in FIG. 16a and and 16b. Here the numerical values of the elements in the matrix A have been written. In FIG. 16 a the highest value in the core is and the highest value in the frame is 3, and so the output signal of the filter is zero. This in FIG. 16b the highest value in the core is 3 and in the frame 1 and the output signal is then 2. That shows that the filter tends to enhance, i.e., provide a larger output signal for objects which in the matrix A have a size which is smaller than or similar to the size of the filter core, whereas larger objects are suppressed i.e., give a small output signal from the filter.

It is to be noted, that it would be sufficient to use a filter which weighs together only the signals from the plane which contains the object and the optical entrances. In the example shown the filter would be illustrated by row No. i.

Figure 15:
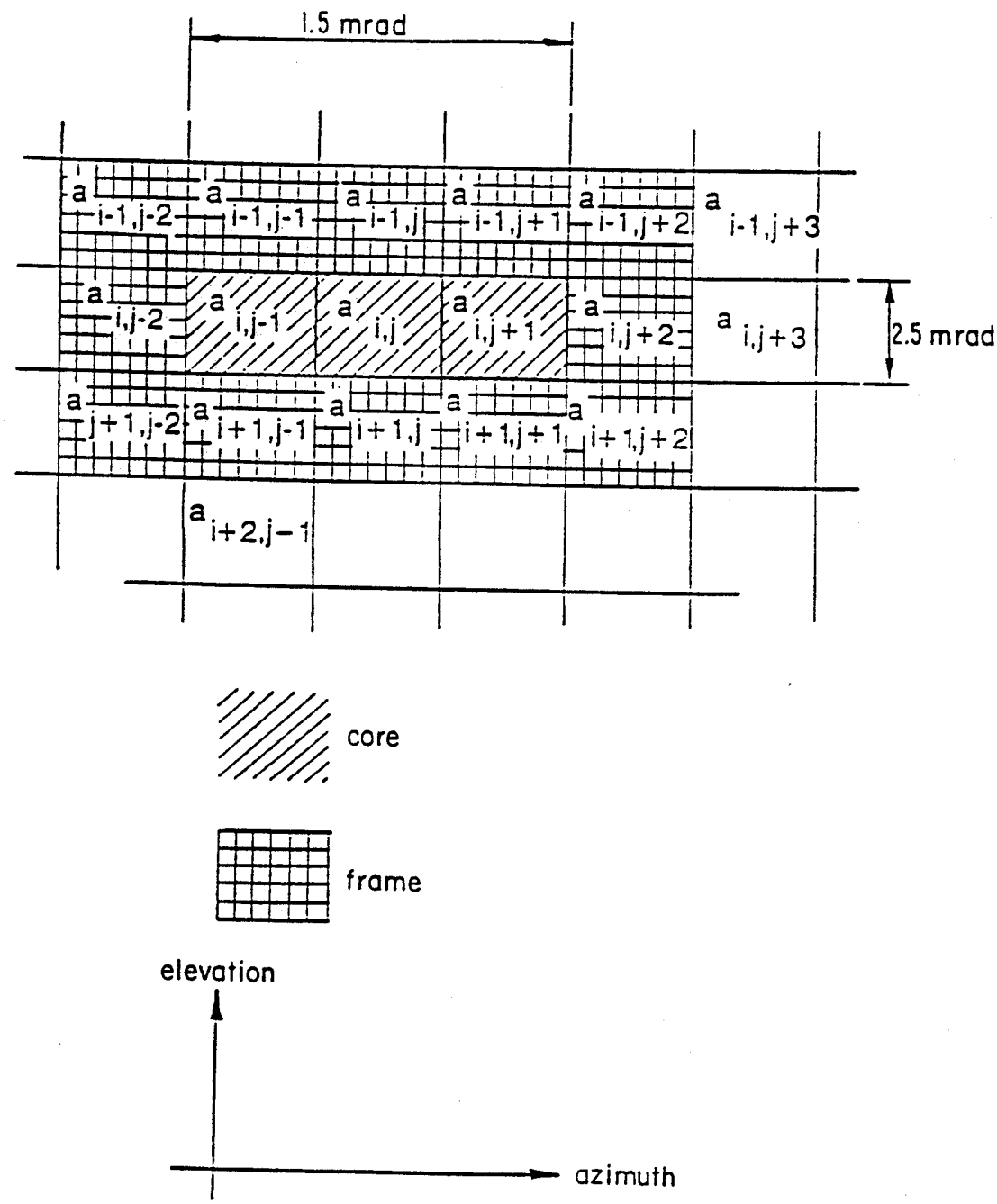

In FIG. 15 the size of the filter core has been given, in azimuth 1.5 mrad and in elevation 2.5 mrad, which values follow from earlier given sampling intervals 0.5 mrad and 2.5 mrad in the respective directions. It can he pointed out here, that an aircraft at a distance of 10 km, seen from the scanner, subtends an angle of generally less than 1.0 mrad, and therefore the aircraft is well within the filter core and will therefore be enhanced by the filter.

It is evident from FIG. 11 that for the distance 90 m, the amplitude of the detector signal will be considerably smaller with four entrances than with one single entrance. The radiation energy, received by the detector is the same in both cases, but in the case of four entrances the energy is received within a larger angular range, i.e., at a certain scanning scale, during a prolonged time and therefore at a lower level of power. The output signal of the detector or, more equally, the output voltage in volts, is always proportional to the incident power in watts the received energy is represented in figure 11 by the area below the respective curves.

It is to be noted that FIG. 11 illustrates a situation where the use of four parallel and laterally separated optical entrances results in the suppression of the signal from an object at such a distance from the scanner that the rays from the object reach the entrances of the scanner divergently. By divergent rays it is thereby understood rays with a relative difference of angel which is the same or larger than not too small a fraction of the angular resolution, which in this case is 1 mrad.

Figure 12:
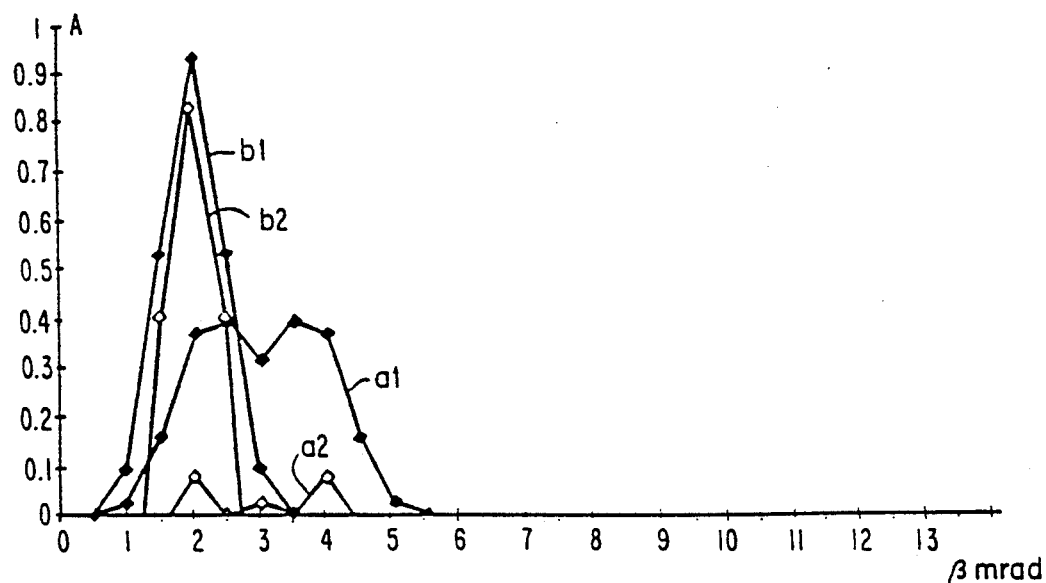
FIGS. 12, 13, and 14a and 14b are graph showing a detector and filter output signal with four and one optical entrances, respectively, at distances of 500 m, 130 m and 10 km, respectively.

In FIG. 12, for a distance of 500 m, there are shown partly the detector signal 1, partly the filter output signal 2 curves a1 and a2 respectively depict the detector signal and filter output signal in the case of four entrances and curves b1 and b2 depict the detector signal and filter output signal with respect to one signal entrance. FIG. 12 illustrates the function of the combination of the four optical entrances on the one hand, and of the filter on the other hand, from the figure it is evident that the filter reduces the signal level considerably more in the case of four entrances than in the case of one single entrance. The reason is that the four laterally separated entrances give a widening of the signal pulse and that the filter is so arranged as to give a tower output signal when the filter input signal is wider.

Figure 13:
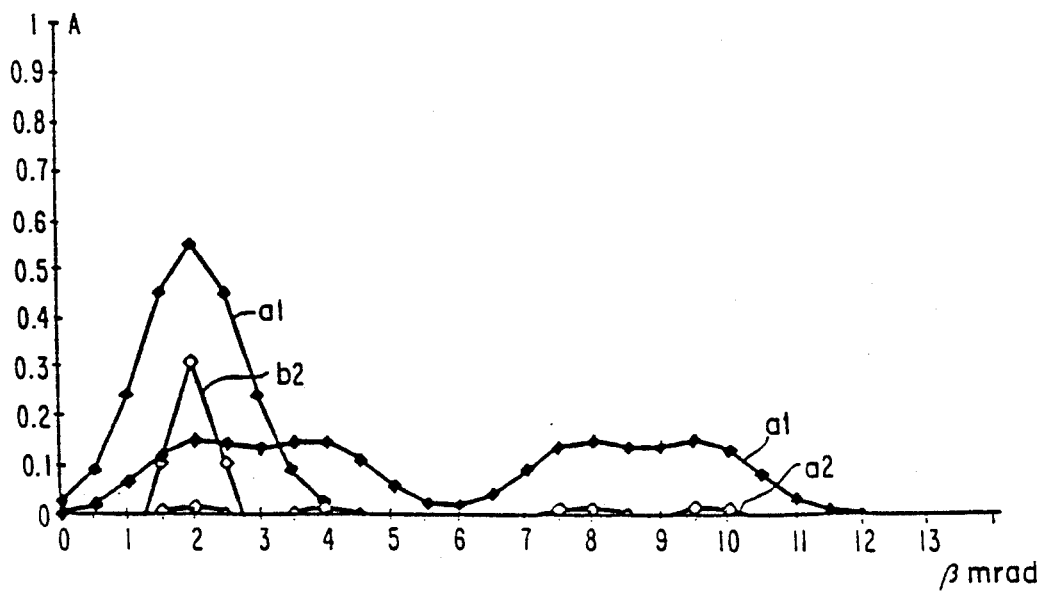

In FIG. 13, for a distance of 130 m, there are shown the signals corresponding to those in FIG. 12. Here, two signal pulses are obtained, in the case of four optical entrances, one for each pair of mirrors. FIG. 13 illustrates the function of arranging the mirrors, with respect to distance, in two pairs, in the manner described above. By arranging the mirrors in this manner at this distance, two wide pulses are obtained which the filter tends to suppress.

Figure 14A:
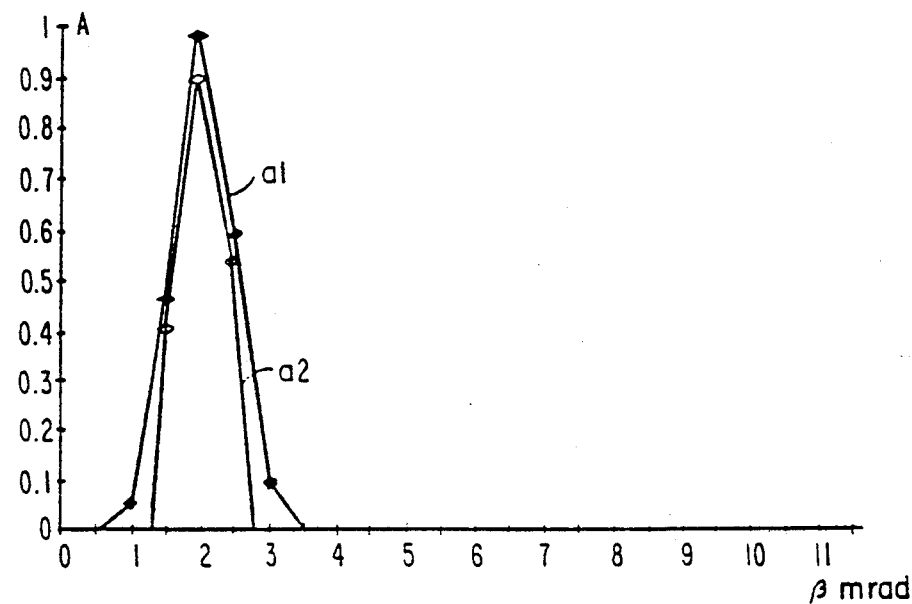
Figure 14B:
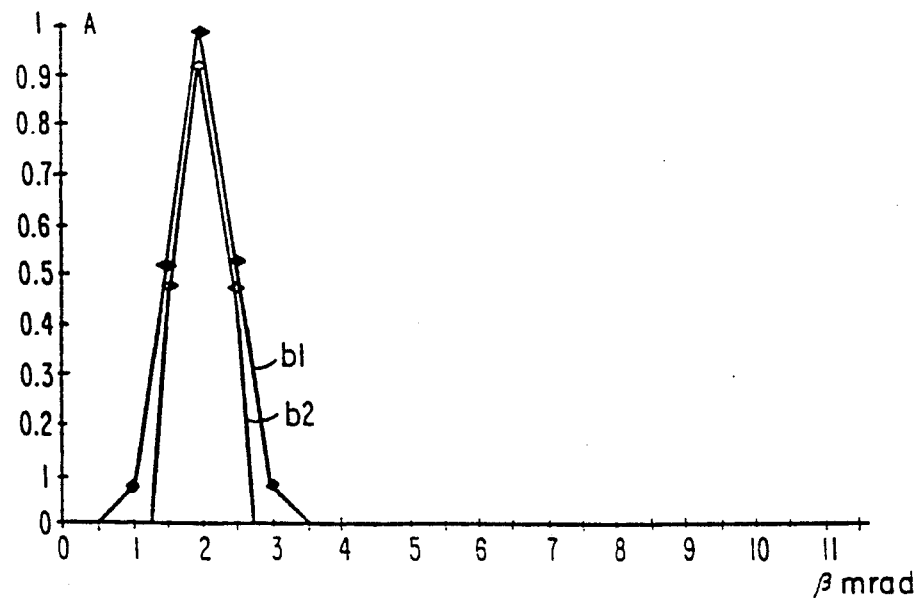

In FIGS. 14a and 14b for a distance of 10 km, there are shown the corresponding signals, as in FIG. 12.

In FIG. 14a, there is depicted curves a1 and a2 respectively corresponding to the detector signal and filter output signal in the case of 4 entrances. In FIG. 4b, curves b1 and b2 repspectively depict the detector signal and filter output signal in the case of 1 entrance.

In FIG. 14a, 14b it is evident that the output signal from the filter is almost as large with four entrances as with a single one. The reason is that the distance is so great relative to the length within which the mirrors are positioned, that the rays from the objects reach the scanner parallel, principally. Targets can thus be detected at long distances as effectively with four laterally separated entrances as with one single entrance.

It should be emphasized that the described embodiment of a device according to the invention is an example. As is evident from the accompanying claims and the description above, there are numerous variants of devices according to the invention. for instance the optical entrances of the sensor unit or units can be positioned vertically in a row.

Even if a digital technique is advantageous, it is also conceivable that the signals need not be sampled, nor need they have a digital form. The filter can be designed in different ways. It can e.g., be an analog filter and function by time instead of by angle.

The transfer function of the filter can be other than that described in the example of the above embodiment, so long as it is arranged to relatively enhance signals from the objects or parts of objects which, when observed from the position of the sensor and in the spectral range of the sensor, show in angular size which is less than a chosen value, but to suppress or, to a smaller degree, enhance signals from objects which show a greater size than that chosen.

The transfer function of the filter need not be fixed, but can be variable for adjustment, e.g., according to the actual conditions in relation to the objects.

The spectral range can be other than the IR-range, e.g., the UV-range the visible range or the mm-wave range.

What is claimed is:

1. A device for the selective detection of objects such as aircraft, missiles, helicopters and the like, by means of detecting outgoing rays from the objects, comprising at least one sensor unit (1) including at least one focusing means (15) arranged to focus said rays on at least one corresponding focal plane, said sensor unit including at least one radiation-sensitive detector element (16) which is positioned in said focal plane, said detector element arranged to emit signals corresponding to a level of radiation of the incoming rays, said device arranged to variably scan an angular field in azimuth and/or elevation, said device further comprising an evaluation unit means (2), arranged to receive said signals, for selecting objects which seem to be of similar size with respect to the angle measured from the position of the device, such objects being large objects at a long distance such as aircraft, and small objects at a short distance, such as birds, by suppressing signals whose amplitude as a function of the scanned azimuth or elevation angle shows a relatively large size compared with signals that show at relatively small size.

2. A device according to claim 1, wherein said sensor unit includes a sensor head having t least two optical entrances arranged at a relative distance to each other across a sight line from the device to the object to receive said rays in the sensor unit for transfer to the focusing means.

3. A device according to claim 1 further including at least two said sensor units (1) respectively having optical entrances (10) positioned to receive outgoing rays from the objects at a relative distance across a sight line from the device to the object.

4. A device according to claim 2, wherein each optical entrance (10) comprises one deflection means, including a mirror (19), arranged for deflecting the incoming rays from the entrance to the corresponding focusing means (15).

5. A device according to claim 1, wherein said sensor unit (1) includes a plurality of detector elements (16) arranged in one direction.

6. A device according to claim 1, wherein said sensor unit includes a plurality of detector elements (16) arranged in two directions.

7. A device according to claim 2, further including means for moving the sensor unit to enable the optical entrances and their respective fields of view to movably scan in azimuth.

8. A device according to claim ?, further including means for moving the sensor unit to enable the optical entrances and their respective fields of view to movably scan in elevation.

9. A device according to any one of claims 1 to 6, wherein the sensor unit (1) comprises at least one optical scanning means, arranged to variably scan an angular range including the field of view which range is thereby scannable, in azimuth and/or elevation, by the corresponding detector elements.

10. A device according to claim 9, further including means for moving said scanning means including said field of view, in azimuth and/or elevation.

11. A device according to claim 1, wherein said at least one sensor unit (1) includes one single focusing means.

12. A device according to claim 2, wherein the device comprises plural optical entrances, arranged in groups.

13. A device according to claim 12, wherein the groups comprise two optical entrances each.

14. The device of claim 1, wherein said evaluation unit means includes an image memory, a filter, a threshold calculator, a comparing means and a target memory, wherein signals from said detector element are temporarily stored in the image memory in a sequency spatially representing different parts of the scanned angular field, said image memory thereby being in the form of a matrix and wherein said threshold calculator and comparing means are connected to each other and the filter to calculate the difference between the signal intensity in a predetermined direction and the signal intensity in an area surrounding it, area by area of the scanned range, with the filter calculating the difference between values representative of signal intensities stored in the matrix, the calculate differences being output signals stored in the target memory in cells of the matrix corresponding to the spatially relevant cells of the image memory.

* * * * *